US006850532B2

(12) United States Patent
Thubert et al.

(10) Patent No.: US 6,850,532 B2
(45) Date of Patent: Feb. 1, 2005

(54) ARRANGEMENT IN A GATEWAY FOR REGISTERING MOBILE ROUTERS OF A MOBILE AD HOC NETWORK TO RESPECTIVE HOME AGENTS

(75) Inventors: Pascal Thubert, La Colle sur Loup (FR); Patrick Wetterwald, Cagnes sur Mer (FR); Marco Molteni, Antibes (FR)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 10/247,512

(22) Filed: Sep. 20, 2002

(65) Prior Publication Data

US 2004/0057440 A1 Mar. 25, 2004

(51) Int. Cl.$^7$ .............................................. H04L 12/28
(52) U.S. Cl. ...................................... 370/401; 370/400
(58) Field of Search ................................ 370/500, 503, 370/510, 509, 515, 330, 300, 365, 367, 304, 400, 401, 491, 436, 350, 354

(56) References Cited

U.S. PATENT DOCUMENTS

| 6,304,556 | B1 | * | 10/2001 | Haas ........................... 370/254 |
| 6,625,135 | B1 | * | 9/2003 | Johnson et al. ............. 370/332 |
| 2002/0061001 | A1 | * | 5/2002 | Garcia-Luna-Aceves et al. 370/338 |

FOREIGN PATENT DOCUMENTS

| EP | 1111874 | * | 6/2001 | ........... H04L/29/06 |
| WO | WO 02/23833 | | 3/2002 | |

OTHER PUBLICATIONS

Johnson et al., "Mobility Support in IPv6", IETF Mobile IP Working Group, Internet–Draft, <draft–ietg–mobileip–ipv6–18.txt>, Jun. 1, 2002.

Belding–Royer et al, "Global Connectivity for IPv4 Mobile Ad hoc Networks", Mobile Ad Hoc Networking Working Group, <draft–royer–manet–globalv4–00.txt>, Nov. 14, 2001.

Baker, "An outsider's view of MANET", Network Working Group, Internet–Draft, draft–baker–manet–review–01, Mar. 17, 2002.

Campbell et al, "Cellular IP", IETF Internet Draft, <draft–ietf–mobileip–cellularip–00.txt>, Jan. 2000.

(List continued on next page.)

Primary Examiner—Wellington Chin
Assistant Examiner—Mark A Mais
(74) Attorney, Agent, or Firm—Leon R. Turkevich

(57) ABSTRACT

A gateway, configured for providing connectivity between a wide area network and mobile routers within a mobile ad hoc network, is configured for registering the mobile routers with their respective home agents using a prescribed mobile IP protocol. The gateway identifies the mobile routers using a prescribed proactive mobile ad hoc network routing protocol. The gateway locates, for each identified mobile router, its corresponding home agent via the wide area network according to the prescribed mobile IP protocol, and registers the corresponding identified mobile router with the home agent according to the prescribed mobile IP protcol. The gateway can then forward a packet received from a home agent to the corresponding mobile router. Hence, the gateway provides mobile routers within a mobile ad hoc network with access to the wide area network, without any necessity for the prescribed mobile IP protocol to be implemented within the mobile routers.

21 Claims, 4 Drawing Sheets

OTHER PUBLICATIONS

Baker, "An outsider's view of MANET", Network Working Group, Internet–Draft, draft–baker–manet–review–01, Mar. 17, 2002.

Wakikawa et al., "Global connectivity for IPv6 Mobile Ad Hoc Networks", Mobile Ad Hoc Networking Working Group, Internet Draft, draft–wakikawa–manet–globalv6–01.txt, Jul. 1, 2002.

Ohnishi et al., Mobile IP Border Gateway (MBG), Mobile IP Working Group, Internet Draft, <draft–ohnishi–mobileip–mbg–00.txt>, Jul. 2001.

Johnson et al., "Mobility Support in IPv6", IETF Mobile IP Working Group, Internet–Draft, <draft–ietg–mobileip–ipv6–18.txt>, Jun. 1, 2002.

* cited by examiner

ARRANGEMENT IN A GATEWAY FOR REGISTERING MOBILE ROUTERS OF A MOBILE AD HOC NETWORK TO RESPECTIVE HOME AGENTS

BACKGROUND OF THE INVENTION

1. Field of the Invention

The present invention relates to registration of mobile routers with respective home agents via a gateway in a mobile ad hoc network.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. For example, the IETF has a Mobile Ad-hoc Networks (MANET) Working Group that is working to develop standardized MANET routing specification(s) for adoption by the IETF.

According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET", available from the IETF on the World Wide Web at the address http://www.ietf.org/internet-drafts/draft-baker-manet-review-01.txt (the disclosure of which is incorporated in its entirety herein by reference), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Although existing MANET protocols focus on the internal connectivity within the unstable topology between mobile devices, the existing MANET protocols suffer from the disadvantage that they provide a poor model for connecting to a wide area network such as the Internet. In particular, MANET proactive protocols allow the mobile nodes to build routing tables for the MANET space, distinct from the routing infrastructure. In addition, existing routing protocols such as Open Shortest Path First (OSPF) Protocol (as specified by the IETF Request for Comments (RFC) 1583), or Intermediate System-to-Intermediate System (IS-IS) protocol (specified by the International Organization for Standardization document ISO 10589) may require up to a minute to converge (i.e., complete protocol communications necessary to establish a connection) and hence not be able to converge quickly enough for a mobile router that is moving from one location to another. For example, in the case of two vehicles passing each other, each having a mobile router, there may exist approximately ten seconds for the mobile routers to establish a connection; hence, routing protocols requiring up to a minute to converge would be unable to establish a connection.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-18.txt (the disclosure of which is incorporated in its entirety herein by reference). According to Johnson et al., the Mobile IPv6 protocol enables a mobile node to move from one link to another without changing the mobile node's IP address. Hence, a mobile node is always addressable by its "home address", an IP address assigned to the mobile node within its home subnet prefix on its home link. Packets may be routed to the mobile node using this address regardless of the mobile node's current point of attachment to the Internet. The mobile node may also continue to communicate with other nodes (stationary or mobile) after moving to a new link. The movement of a mobile node away from its home link is thus transparent to transport and higher-layer protocols and applications.

In addition, Johnson et al. assumes that use of Mobile IPv6 eliminates the need to deploy special routers as "foreign agents" as are used in Mobile IPv4. In Mobile IPv6, mobile nodes make use of IPv6 features, to operate in any location without any special support required from the local router.

Still another protocol is suggested in an Internet Draft by Wakikawa et al., entitled "Global Connectivity for IPv6 Mobile Ad Hoc Networks", available on the World Wide Web at the address: http://www.ietf.org/internet-drafts/draft-wakikawa-manet-globalv6-01.txt (the disclosure of which is incorporated in its entirety herein by reference). According to Wakikawa et al., a MANET node can obtain a global address from an Internet gateway, and send data to the Internet using a Mobile IPv6 routing header specifying the gateway.

However, requiring all mobile routers to utilize Mobile IPv6 may impose additional processing requirements on the mobile routers, increasing cost and complexity.

SUMMARY OF THE INVENTION

There is a need for an arrangement that enables a mobile router in a mobile ad hoc network to establish a communication link with a wide area network, including registeration with an associated home agent, without the necessity of the mobile router executing mobile IPv6 protocol.

There also is a need for an arrangement that enables mobile ad hoc network nodes to access a wide area network without modification to the mobile ad hoc network nodes.

These and other needs are attained by the present invention, where a gateway, configured for providing connectivity between a wide area network and mobile routers within a mobile ad hoc network, is configured for registering the mobile routers with their respective home agents using a prescribed mobile IP protocol. The gateway identifies the mobile routers using a prescribed proactive mobile ad hoc network routing protocol. The gateway locates, for each identified mobile router, its corresponding home agent via the wide area network according to the prescribed mobile IP protocol, and registers the corresponding identified mobile router with the home agent according to the prescribed mobile IP protcol. The gateway can then forward a packet received from a home agent to the corresponding mobile router. Hence, the gateway provides mobile routers within a mobile ad hoc network with access to the wide area network, without any necessity for the prescribed mobile IP protocol to be implemented within the mobile routers.

One aspect of the present invention provides a method in a gateway, configured for providing connectivity between a wide area network and mobile routers within a mobile ad hoc network. The method includes identifying the mobile routers within the mobile ad hoc network using a prescribed proactive mobile ad hoc network routing protocol, and locating, for each identified mobile router, a corresponding home agent via the wide area network according to a prescribed mobile IP protocol. The method also includes registering each identified mobile router with the corresponding home agent according to the prescribed mobile IP protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
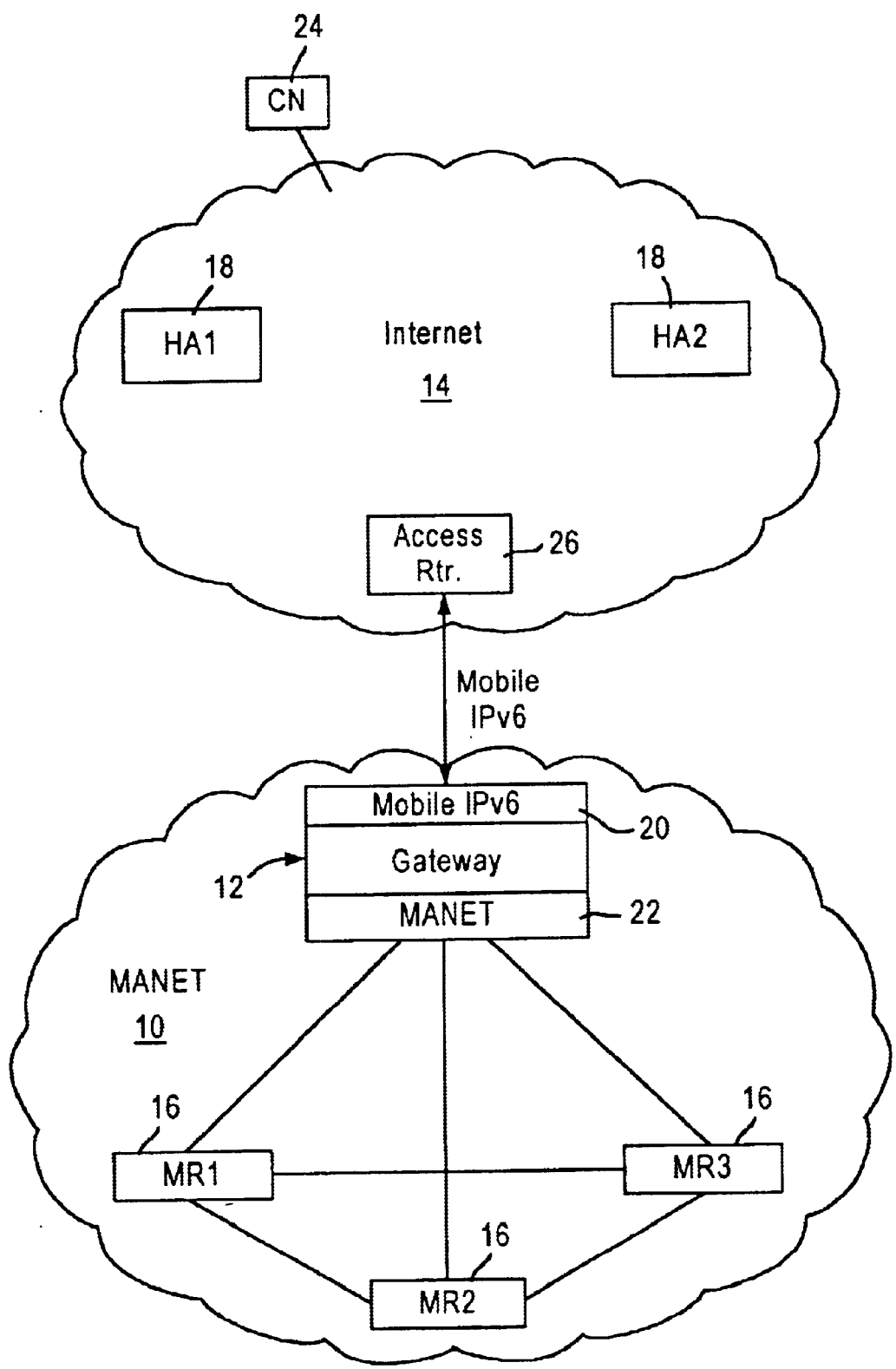
FIG. 1 is a diagram illustrating a mobile ad hoc network having a gateway for providing connectivity with a wide area network, such as the Internet, according to an embodiment of the present invention.

FIG. 1 is a diagram illustrating a mobile ad hoc network (MANET) 10 having a gateway 12 configured for providing connectivity with a wide area network 14, according to an embodiment of the present invention. The gateway 12 is configured for providing connectivity with the wide area network 14, for example the Internet, using mobile IPv6 protocol 20 as described in the above-incorporated Internet Draft by Johnson et al. In particular, the gateway 12 is configured for identifying the mobile routers 16 within the mobile ad hoc network 10 using a prescribed proactive mobile ad hoc network routing protocol 22. The gateway 12, upon identifying the mobile routers 16 within the MANET 10, searches for home agents 18 via the wide area network 14 that are configured for serving the mobile routers 16, using a prescribed mobile IPv6 protocol 20. The gateway 12 then registers the mobile routers 16 with the appropriate selected home agents 18 using mobile IPv6 protocol 20, enabling the mobile routers 16 to communicate with a correspondent node (CN) 24, without the necessity of the mobile routers 16 to utilize mobile IPv6 protocol. Hence, the gateway 12 operates as an autoproclaimed foreign agent on behalf of the mobile routers 16.

Hence, use of the gateway 12 to register the mobile routers 16 with the appropriate home agents 18 according to mobile IPv6 protocol 20 enables the mobile routers 16 to execute routing operations using prescribed MANET protocols 22. Hence, all connectivity within the MANET 10 is executed according to a prescribed MANET protocol 22.

Figure 2:
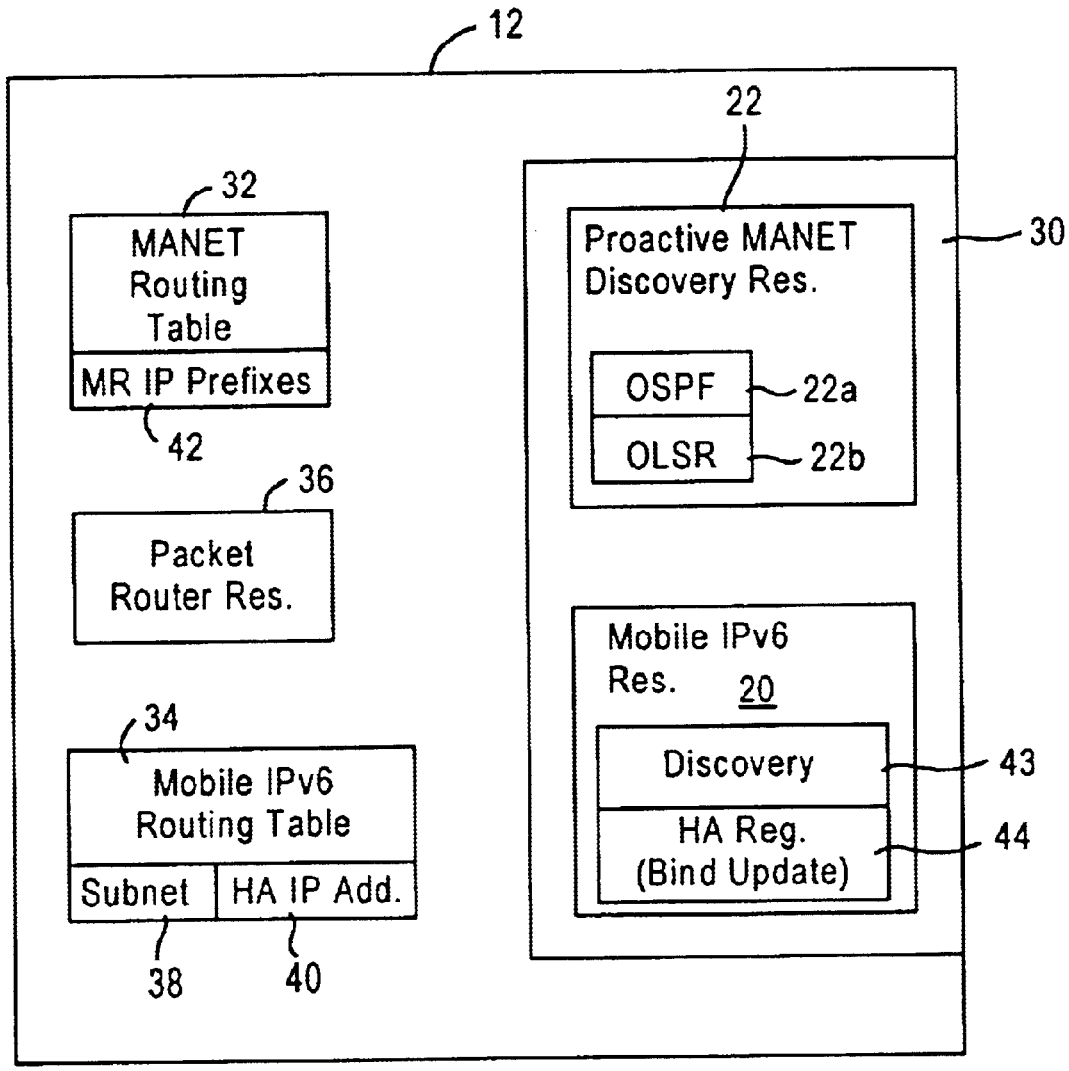
FIG. 2 is a diagram illustrating in detail the gateway of FIG. 1.

FIG. 2 is a diagram illustrating in detail the gateway 12, according to an embodiment of the present invention. The gateway 12 includes an Internet protocol (IP) interface 30, including MANET protocol resources 22 configured for execution of MANET protocol communications within the MANET 10, and mobile IPv6 protocol resources 20 configured for execution of mobile IPv6 protocol communications with an access router 26 of the wide area network 14.

Exemplary proactive MANET protocol resources 22 that may be utilized for identifying the mobile routers 16 include an OSPF (ver. 3) resource 22a, configured for monitoring link connectivity information advertised by each mobile router 16 in the MANET 10 and maintaining a MANET routing table 32; another routing protocol that may be used is Source Tree Adaptive Routing (STAR) protocol, described in an Internet Draft by J. J. Garcia-Luna-Aceves et al., available from the IETF on the World Wide Web at http://www.ietf.org/proceedings/99nov/I-D/draft-ietf-manet-star-00.txt. The MANET routing table 32 is configured for storing IP address prefixes 42 of the mobile routers and associated connectivity and routing information (e.g., link state status, etc.). The MANET protocol resources 22 also may includes an Optimized Link State Routing (OLSR) Protocol resource 22b, configured for identifying the mobile routers 16 using hello messages and link state flooding to populate the MANET routing table 32. Additional information regarding the MANET protocol resources 22 is described in the above-incorporated Internet Draft by Baker.

The gateway 12 also includes a mobile IPv6 routing table 34, and a packet router resource 36 configured for forwarding packets received from a home agent 18 via a tunnel connection to the destination mobile routers 16 based on the subnet information 38 stored in the routing table 34, and the IP address prefix 42 stored in the MANET table.

The mobile IPv6 routing table 34 is populated by a mobile IPv6 discovery resource 43, configured for discovering the home agents 18 by the prefix of a Mobile Router as advertised over the MANET protocol. In particular, the mobile IPv6 discovery resource 43 is configured for outputting a Home Agent Address Discovery Request message to an anycast address identified for a subnet prefix. In particular, each mobile router 16 has a unique IP address, where part of the IP address includes a subnet prefix that identifies a subnet to which the mobile router 16 belongs to (i.e., the subnet for which the corresponding home agent 18 is a member); since multiple mobile routers 16 (e.g., MR1, MR2) may belong to the same subnet and have the same subnet prefix, the discovery resource 43 is configured for discovering each home agent 18 associated with a corresponding subnet prefix.

As specified by the above-incorporated Internet Draft by Johnson et al., a home agent 18 is configured for responding to a Home Agent Address Discovery Request message by outputting a Home Agent Address Discovery Reply message, which specifies the home agent IP addresses that may be utilized for the corresponding subnet prefix (i.e., the routers within the subnet that may serve as home agents). The discovery resource 43, in response to receiving a Home Agent Address Discovery Reply message, updates the mobile IPv6 routing table 34 with the home agent IP addresses 40 that may be used for the corresponding subnet prefix 38.

The mobile IPv6 resource 20 also includes a home agent registration resource 44 configured for registering each identified mobile router 16 associated with a given subnet prefix with the corresponding home agent 18 by sending a bind update message. Additional details relating to mobile router registration are provided in the above-incorporated Internet Draft by Johnson et al.

Figure 3A:
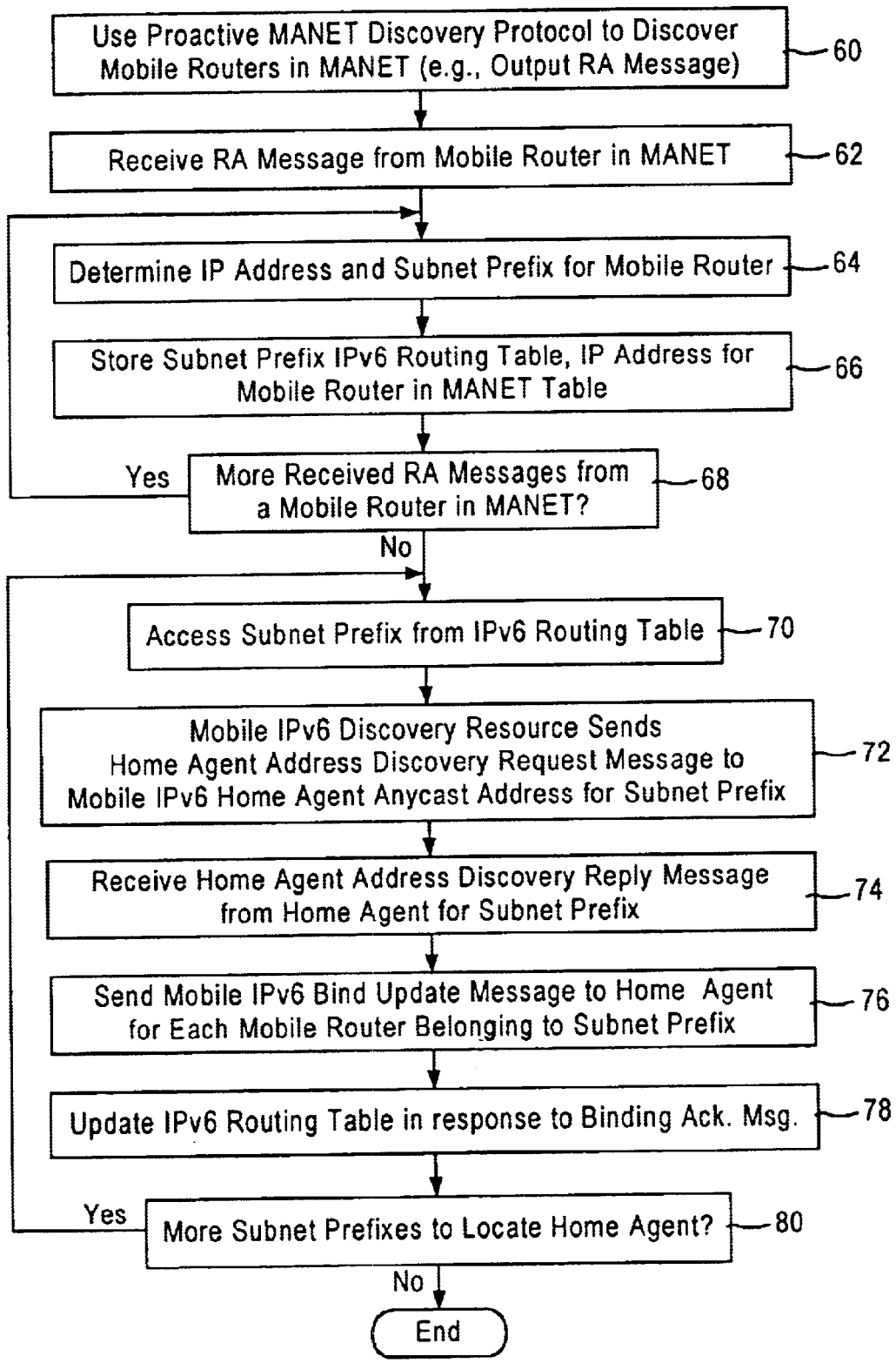
FIGS. 3A and 3B are diagrams summarizing the method by the gateway of providing connectivity for routers of an ad hoc mobile network to a wide area network, according to an embodiment of the present invention.
Figure 3B:
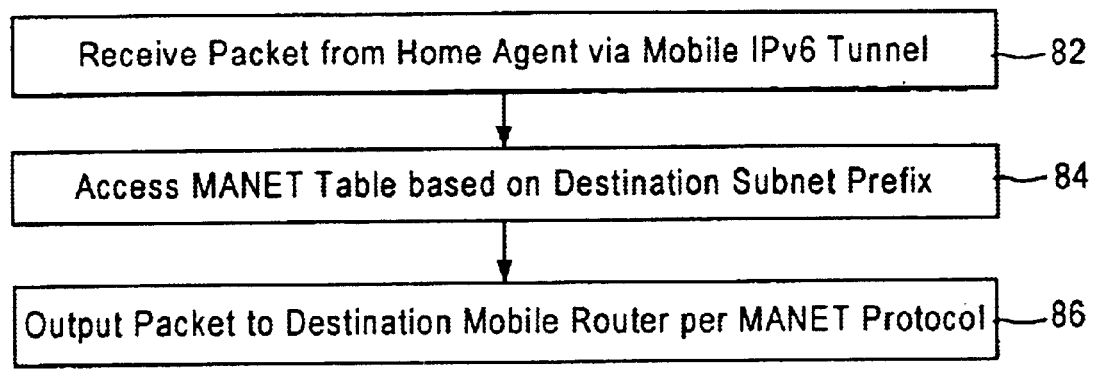

FIGS. 3A and 3B are diagrams illustrating the method by the gateway 12 of registering with the home agents 18 on behalf of the the mobile routers 16 of the MANET 10, according to an embodiment of the present invention. The steps described in FIGS. 3A and 3B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method begins in step 60, where the MANET discovery resource 22 uses one of the available proactive MANET routing discovery protocols (e.g., OSPF 22a or OLSR 22b) to discover the mobile routers 16 within the MANET 10, for example by sending hello messages or router advertisement messages. In response to receiving a router advertisement message (or a response to the hello message) from a mobile router 16 in step 62, the discovery resource 22 determines in step 64 the IP address prefix 42 for the mobile router 16, including the subnet prefix 38. The discovery resource 22 stores in step 66 the subnet prefix 38 in the mobile IPv6 routing table 34 and the IP address prefix 42 in the MANET routing table 32. The discovery resource 22 continues proactive identification of the mobile routers 16 of the MANET 10 in step 68.

As soon as a subnet prefix 38 has been stored in the routing table 34, the discovery resource 43 can begin searching for a corresponding home agent 18 by retrieving in step 70 the subnet prefix from the routing table 34, and sending in step 72 a Home Agent Address Discovery Request Message utilizing an anycast address based on the retrieved subnet prefix. In response to receiving in step 74 a Home Agent Address Discovery Reply Message, the discovery resource 43 stores the home agent address 40 for the subnet prefix specified in the Home Agent Address Discovery Reply Message in the mobile IPv6 routing table 34. The home agent registration resource 44 then sends in step 76 a bind update message to the home agent 18 specified by the stored home agent IP address 40, for each mobile router 16 belonging to the corresponding subnet prefix 38. The bind update resource 44 updates in step 78 the IPv6 routing table 34 in response to receiving an acknowledgment message from the home agent 18, and continues locating the home agent for any additional subnet prefixes in step 80. Note that the registration procedure illustrated in FIG. 3A may be repeated in response to expiration of timers associated with any entry of the tables 32 or 34.

Hence, registration of the mobile routers 16 with their home agents 18 by the gateway 12 eliminates the necessity for the mobile routers 16 to utilize mobile IPv6 protocol. As illustrated in FIG. 3B, the packet router resource 36 responds to reception of a packet from a home agent 18 via a mobile IPv6 tunnel in step 82 by accessing in step 84 the MANET table 32 based on the destination subnet prefix, and outputs in step 86 the packet to the destination mobile router 16 according to MANET routing protocols.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a gateway, configured for providing connectivity between a wide area network and mobile routers within a mobile ad hoc network, the method comprising:

identifying the mobile routers within the mobile ad hoc network using a prescribed proactive mobile ad hoc network routing protocol;

locating, for each identified mobile router, a corresponding home agent via the wide area network according to a prescribed mobile IP protocol; and registering each identified mobile router with the corresponding home agent according to the prescribed mobile IP protocol.

2. The method of claim 1, further comprising forwarding a packet, received from an identified one of the home agents, to the corresponding mobile router within the ad hoc network.

3. The method of claim 1, wherein the identifying step includes:

determining, for each mobile router, an IP address utilized by the corresponding mobile router, the IP address including a corresponding subnet prefix; and storing the subnet prefix in a table.

4. The method of claim 3, wherein the determining step includes discovering each mobile router based on a prescribed discovery protocol of the prescribed proactive mobile ad hoc network routing protocol.

5. The method of claim 3, wherein the locating step includes discovering the home agent associated with the stored subnet prefix, based on mobile IPv6 protocol.

6. The method of claim 5, wherein the registering step includes registering each mobile router, associated with the stored subnet prefix, with the corresponding home agent according to mobile IPv6 protocol.

7. The method of claim 6, further comprising:

receiving a packet via a tunnel from one of the home agents, the packet having a destination IP address specifying a destination subnet prefix;

accessing the table for identification of one of the mobile routers as a destination for the packet based on destination the subnet prefix; and outputting the packet to the one mobile router according to a prescribed mobile ad hoc network routing protocol.

8. A gateway configured for providing connectivity between a wide area network and mobile routers within a mobile ad hoc network, the gateway comprising:

means for identifying the mobile routers within the mobile ad hoc network using a prescribed proactive mobile ad hoc network routing protocol;

means for locating, for each identified mobile router, a corresponding home agent via the wide area network according to a prescribed mobile IP protocol; and means for registering each identified mobile router with the corresponding home agent according to the prescribed mobile IP protocol.

9. The gateway of claim 8, further comprising means for forwarding a packet, received from an identified one of the home agents, to the corresponding mobile router within the ad hoc network.

10. The gateway of claim 8, wherein the identifying means is configured for:
   determining, for each mobile router, an IP address utilized by the corresponding mobile router, the IP address including a corresponding subnet prefix; and
   storing the subnet prefix in a table.

11. The gateway of claim 10, wherein the identifying means is configured for determining the IP address utilized by the corresponding mobile router by discovering each mobile router based on a prescribed discovery protocol of the prescribed proactive mobile ad hoc network routing protocol.

12. The gateway of claim 10, wherein the locating means is configured for discovering the home agent associated with the stored subnet prefix, based on mobile IPv6 protocol.

13. The gateway of claim 12, wherein the registering means is configured for registering each mobile router, associated with the stored subnet prefix, with the corresponding home agent according to mobile IPv6 protocol.

14. The gateway of claim 13, further comprising means for receiving a packet via a tunnel from one of the home agents, the packet having a destination IP address specifying a destination subnet prefix, the receiving means further configured for:
   accessing the table for identification of one of the mobile routers as a destination for the packet based on destination the subnet prefix; and
   outputting the packet to the one mobile router according to a prescribed mobile ad hoc network routing protocol.

15. A computer readable medium having stored thereon sequences of instructions for providing connectivity between a wide area network and mobile routers within a mobile ad hoc network by a gateway, the sequences of instructions including instructions for performing the steps of:
   identifying the mobile routers within the mobile ad hoc network using a prescribed proactive mobile ad hoc network routing protocol;
   locating, for each identified mobile router, a corresponding home agent via the wide area network according to a prescribed mobile IP protocol; and
   registering each identified mobile router with the corresponding home agent according to the prescribed mobile IP protocol.

16. The medium of claim 15, further comprising instructions for performing the step of forwarding a packet, received from an identified one of the home agents, to the corresponding mobile router within the ad hoc network.

17. The medium of claim 15, wherein the identifying step includes:
   determining, for each mobile router, an IP address utilized by the corresponding mobile router, the IP address including a corresponding subnet prefix; and
   storing the subnet prefix in a table.

18. The medium of claim 17, wherein the determining step includes discovering each mobile router based on a prescribed discovery protocol of the prescribed proactive mobile ad hoc network routing protocol.

19. The medium of claim 17, wherein the locating step includes discovering the home agent associated with the stored subnet prefix, based on mobile IPv6 protocol.

20. The medium of claim 19, wherein the registering step includes registering each mobile router, associated with the stored subnet prefix, with the corresponding home agent according to mobile IPv6 protocol.

21. The medium of claim 20, further comprising instructions for performing the steps of:
   receiving a packet via a tunnel from one of the home agents, the packet having a destination IP address specifying a destination subnet prefix;
   accessing the table for identification of one of the mobile routers as a destination for the packet based on destination the subnet prefix; and
   outputting the packet to the one mobile router according to a prescribed mobile ad hoc network routing protocol.

* * * * *